United States Patent [19]

Haussuehl

[11] 3,794,413
[45] Feb. 26, 1974

[54] STRONTIUM FORMATE NONLINEAR DEVICE

[75] Inventor: Siegfried Haussuehl, Weyertal 82, 5 Cologne 41, Germany

[22] Filed: Mar. 7, 1972

[21] Appl. No.: 232,409

[30] Foreign Application Priority Data
Mar. 26, 1971 Germany.................. P 21 14 842.5

[52] U.S. Cl. ............................ 350/160 R, 307/88.3
[51] Int. Cl............................ G02f 1/00, H03f 7/00
[58] Field of Search......... 350/160 R, 161; 307/88.3

[56] References Cited
UNITED STATES PATENTS
3,679,907   7/1972   Bonner et al. ..................... 307/88.3
3,506,929   4/1970   Ballman et al. .................. 350/160 R OTHER PUBLICATIONS
Hackh's Chemical Dictionary, Third Edition, McGraw-Hill, 1944, pg. 811, copy Sci. Libr.

Primary Examiner—John K. Corbin
Assistant Examiner—V. P. McGraw
Attorney, Agent, or Firm—Hill, Sherman, Meroni, Gross & Simpson

[57] ABSTRACT

A nonlinear optical component having a single crystal which has electro-optical properties characterized by the single crystal being an orthorhombic crystal of strontium formate. The nonlinear optical component is particularly useful in a system for handling electromagnetic radiation in the infrared, visible and ultraviolet spectral ranges and for producing a harmonic frequency of a basic frequency of light radiated of the component.

2 Claims, 1 Drawing Figure

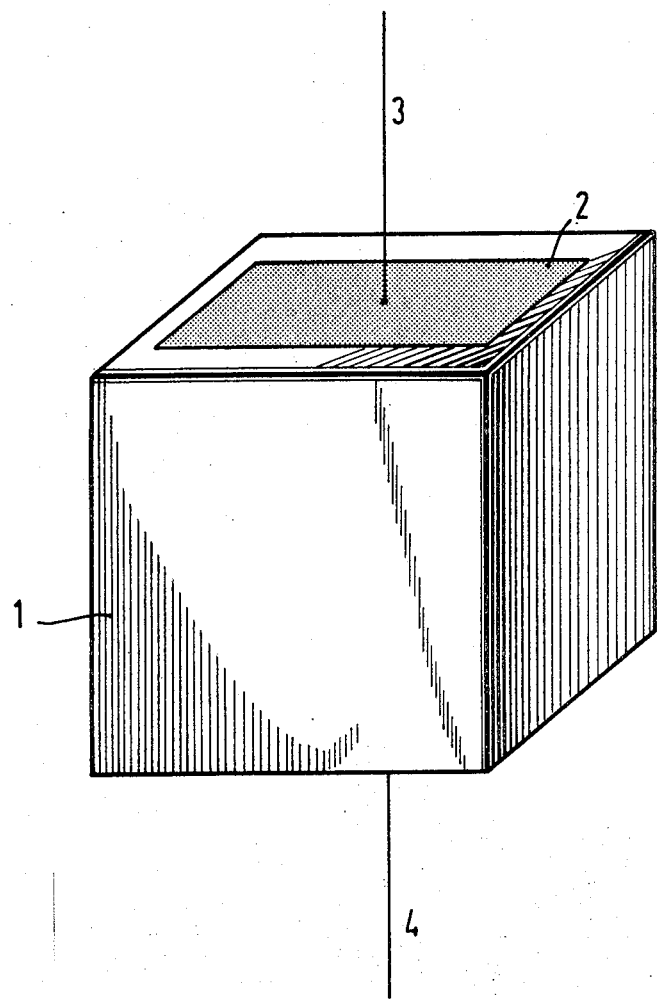

STRONTIUM FORMATE NONLINEAR DEVICE

BACKGROUND OF THE INVENTION

1. Field of the Invention

The present invention is directed to a nonlinear optical component or device particularly useful in a system to modulate a light beam or in a system for generating a harmonic frequency of a base frequency of electromagnetic radiation.

2. Prior Art

Nonlinear optical material, such as ammonium dihydrogen phosphate (ADP), potassium dihydrogen phosphate (KDP) or lithium niobate ($LiNbO_3$) are known for use as a crystal component to produce a doubling in the frequency of light radiated on the crystal. Each of these materials have nonlinear dielectric characteristics whose permittivity is a function of the electrical field strength. If light of a certain frequency, a so-called basic frequency, is radiated into the crystal, a light is emitted by the crystal which is a harmonic frequency of the basic frequency initially radiated on the crystal. Nonliner optical components have also been suggested for modulating an electromagnetic radiation such as a light beam.

SUMMARY OF THE INVENTION

The present invention is directed to a nonlinear optical component or device for electromagnetic radiation in the infrared, visible and ultraviolet spectral ranges which component has a larger effectivity than the known components using known crystals. The component has a single crystal which basically consists of an orthorhombic crystal of strontium formate which is preferably a doped crystal and which crystal has electro-optical properties. The component is adapted for use in a system for handling electromagnetic radiation and can be used to produce a harmonic frequency of the frequency of light projected on the component. With electrodes to apply a voltage to the single crystal, the component can be used in an electro-optical system for modulating a light beam passing through the crystal or for deflecting the light beam.

BRIEF DESCRIPTION OF THE DRAWING

The FIGURE is a perspective view of the component of the present invention.

DESCRIPTION OF THE PREFERRED EMBODIMENT

The principles of the present invention are particularly useful when incorporated in a nonlinear optical component 1 which is illustrated as having an electrode 2 of a pair of electrodes on one surface which electrode has a lead 3 and the other electrode of the pair has a lead 4. The leads 3 and 4 deliver an appropriate control signal to the pair of electrodes to apply a voltage to the crystal to achieve an electro-optic effect and the signal is provided to the leads in a conventional manner.

The nonlinear optical component 1 has a single crystal which basically consists of a single orthorhombic crystal of strontium formate which has a formula of $Sr(HCOO)_2$. Preferably the single crystal is a doped orthorhombic crystal of strontium formate. The crystal of strontium formate, whether doped or not doped, has an electro-optical property and can be used to apply an electro-optic effect on electromagnetic radiation.

It was found that a single orthorhombic crystal of the strontium formate not only has extremely high components for the nonlinear tensor of the dielectric susceptibility but also has the optical properties such as anisotropy and dispersion which are required for a phase adjustment of the primary and secondary electromagnetic waves. Therefore the crystal is well suited for the phase adapted frequency doubling as well as for control and modulation of electro-magnetic radiation with a high efficiency. The phase adaptation takes place in the dispersion between a basic wave and its harmonic frequency if a compensation is made by the suitable selection of the index of refraction difference of these waves. An index of refraction difference occurs for different orientation of the electrical vector with respect to the crystal coordinate system due to the optical anisotropy of the crystal.

Since the speed of a wave decreases with increasing frequency in a dispersive crystal and the speed is also in a reverse proportion to the index of refraction, a phase adjustment can be reached by changing the amount of double refraction of the light beam by the crystal. For instance, the amount of double refraction of the light beam can be changed by turning the crystal so that the angle of orientation of the beam is changed with respect to the optical axis of the crystal. The amount of double refraction of the light beam can also be changed by the electro-optical effect for example by an application of a voltage to the electrodes which are attached to the crystal.

The crystal has a good transparency for radiation in a range other than the visible spectral range and thus the crystal can be used with radiation which is in the infrared and ultraviolet spectral ranges.

Since the single orthorhombic crystal of strontium formate has electro-optical properties, the crystal of the invention is especially suited for electro-optical purposes such as modulation, control and deflection of electromagnetic radiation.

Although various modifications might be suggested by those versed in the art, it should be understood that I wish to employ within the scope of the patent granted hereon, all such modifications that reasonably and properly come within the scope of my contribution to the art.

I claim:

1. A method for obtaining a harmonic frequency of a basic frequency of electromagnetic radiation comprising projecting the electromagnetic radiation of the basic frequency through a nonlinear optical component having a single orthorhombic crystal consisting essentially of strontum formate which emits a harmonic frequency of the basic frequency.

2. A method for controlling a beam of electromagnetic radiation comprising projecting the beam through a single orthorhombic electro-optical crystal consisting essentially of strontium formate and changing the optical properties of the crystal by applying a voltage to electrodes disposed on said crystal so that the properties of the beam of light projected through the crystal are changed in response to the change in the optical properties of the crystal.

* * * * *